Jan. 17, 1928.
R. H. LAKE
1,656,487
NUTCRACKER
Filed March 2, 1927
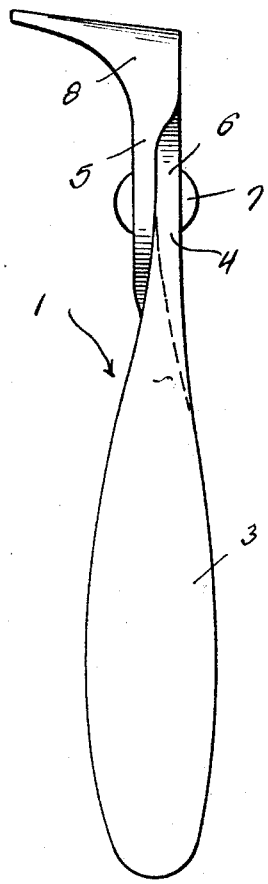
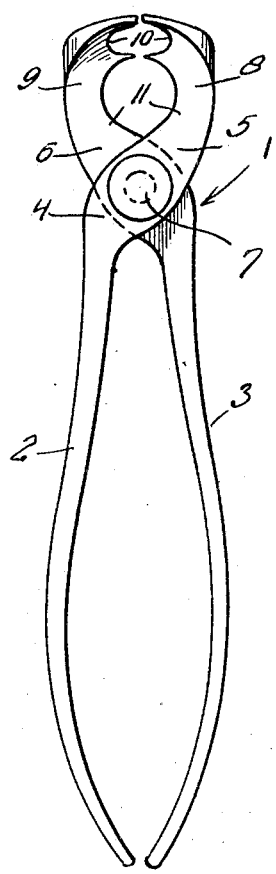
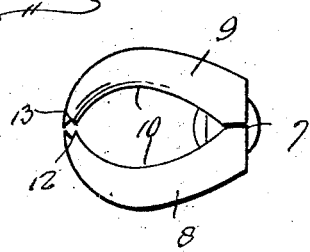
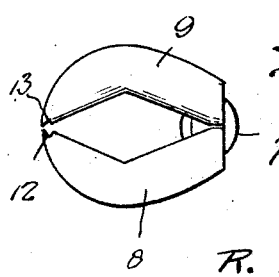
Inventor
R. H. Lake,
By Clarence A. O'Brien
Attorney Patented Jan. 17, 1928.

1,656,487

UNITED STATES PATENT OFFICE.

RALPH HEAMAN LAKE, OF PUTNAM, TEXAS.

NUTCRACKER.

Application filed March 2, 1927. Serial No. 172,077.

The present invention relates to nut crackers and has for its principal object to provide a tool which comprises a pair of pivoted cross levers, the pivoted ends thereof being so constructed as to provide a pair of complementary jaws whose inner edges are sharpened and so shaped as to facilitate the cracking of the hard shell of a nut and severing the kernels into halves without crushing the meat of the nuts.

Another important object of the invention is to provide a nut cracker of the above mentioned character wherein the outer ends of the complementary pivoted jaws may be utilized for the purpose of breaking up and removing the shells from each half section of the nut.

A still further object is to provide a nut cracker of the above-mentioned character which is simple in its construction and advantages of this invention will become apparent during the course of the following description.

Other objects and advantages of this invention will become apparent during the course of the following description.

In the accompanying drawing forming part of this specification and in which like numerals are employed to designate like parts throughout the same;

Figure 1 is a side elevation of the nut cracker embodying my invention,

Figure 2 is a front elevation thereof,

Figure 3 is a top plan view and

Figure 4 is a similar view showing a modification of the jaw structure, more particularly the cutting edges thereof.

In the drawing wherein for the purpose of illustration is shown the preferred embodiment of my invention, the numeral 1 designates generally my improved nut cracker, the same comprising a pair of cross levers 2 and 3 which are twisted as at 4 adjacent their upper ends and the upper end portions 5 and 6 of the levers 2 and 3 respectively intersect and are pivotally connected together as at 7. The upper end portions 5 and 6 of the levers 2 and 3 are disposed at right angles with respect to the major portion of the levers.

This is clearly illustrated in Figure 1 of the drawing. The upper ends are further so constructed as to provide complementary jaws 8 and 9 and the inner opposed edges of these jaws are curved as illustrated more clearly at 10 in Figure 3, the inner opposed curved edges 10 are furthermore sharpened to facilitate the ready and easy splitting or breaking of the shell and the cutting of the kernel or meat of the nut into half sections.

As is also more clearly illustrated in the drawing, the complementary jaws 8 and 9 are disposed laterally and at substantially right angles to the upper end portions 5 and 6 and the disposition of the jaws in this manner will permit the nut cracker to be more efficiently handled when in use. The inner opposed edges of the upper ends 5 and 6 point directly above the pivot 7 and are also curved as illustrated at 11 in Figure 2, thus adding to the lightness of the implement.

The lower ends of the flat levers are curved inwardly towards each other and these levers provide suitable handles for opening and closing the complementary co-acting jaws 8 and 9 as is readily obvious from the structure shown in the accompanying drawing.

In Figure 4 of the drawing, there is shown a modification of the complementary jaws 8 and 9 wherein the cutting edges of the jaws are of angular configuration so that when the jaws are closed, a substantially diamond-shaped opening between the jaws will be formed.

Co-acting notches 12 and 13 are formed in the outer ends of the jaws 8 and 9 respectively and the purpose thereof will be hereinafter more fully explained.

In use, the implement is more particularly adapted for cracking pecans and the nut is placed between the jaws with the pointed ends thereof disposed within a portion of the opening formed by the curved edges 10 and by grasping the levers 2 and 3 and forcing the same together, the cutting edges 10 will split the shell and cut through the kernel of the nut thus dividing the nut into two half sections.

Each half section is then held in the hand of the person using the device so that the cooperating notches 12 and 13 will engage the edge of the shell and by moving the implement downwardly, the shell will be separated from the meat of the nut and thereby will be entirely removed without resulting in the meat of the nut being crushed.

The provision of a nut cracker of the above mentioned character will not only save considerable time and labor in cracking the nut but will perform such an operation without crushing the meat which is one of the objections with the use of the type of nutcrackers now generally on the market.

While I have shown the preferred embodiment of my invention, it is to be understood that various changes in the size, shape and arrangement of parts may be resorted to without departing from the spirit or sacrificing any of the advantages of the appended claims.

I claim:—

1. A nut-cracker of the class described comprising a pair of pivoted cross levers, a pair of co-acting jaws formed on the pivoted ends of the levers, the other ends of the levers providing handles for actuating the same, the inner opposed edges of the jaws being sharpened whereby the nuts may be divided into half sections, the outer ends of the jaws having complementary notches formed therein for removing the shells from each half section.

2. A nut-cracker of the class described comprising a pair of pivoted cross levers, a pair of co-acting jaws formed on the pivoted ends of the levers, the other ends of the levers providing handles for actuating the same, the inner opposed edges of the jaws being sharpened whereby the nuts may be divided into half sections, the outer ends of the jaws having complementary notches formed therein for removing the shells from each half section, said complementary jaws being disposed at substantially right angles to the levers.

3. A nut-cracker of the class described comprising a pair of elongated flat levers, the upper ends thereof being twisted and disposed at right angles with respect to the levers, a pivot pin extending through the twisted portions of the levers at their point of intersection, a pair of complementary jaws formed on the upper ends of the levers and disposed at right angles thereto, the inner opposed edges of said jaws being sharpened for splitting the shell and dividing the nut into half-sections, the other ends of the levers providing handles for actuating the same.

In testimony whereof I affix my signature.

RALPH HEAMAN LAKE.